United States Patent
Hulse et al.

(10) Patent No.: US 7,011,421 B2
(45) Date of Patent: Mar. 14, 2006

(54) ILLUMINATION DEVICE FOR SIMULATING NEON LIGHTING THROUGH USE OF FLUORESCENT DYES

(75) Inventors: George R. Hulse, Cookeville, TN (US); John R. Dominick, Cookeville, TN (US); Mark J. Cleaver, Wilmette, IL (US); Eric Olav Eriksson, Evanston, IL (US)

(73) Assignee: iLight Technologies, Inc., Evanston, IL (US)

( * ) Notice: Subject to any disclaimer, the term of this patent is extended or adjusted under 35 U.S.C. 154(b) by 351 days.

(21) Appl. No.: 10/455,639

(22) Filed: Jun. 5, 2003

(65) Prior Publication Data

US 2003/0198049 A1  Oct. 23, 2003

Related U.S. Application Data

(63) Continuation-in-part of application No. 09/982,705, filed on Oct. 18, 2001, now Pat. No. 6,592,238.

(60) Provisional application No. 60/387,076, filed on Jun. 6, 2002.

(51) Int. Cl.
*F21V 21/00* (2006.01)
(52) U.S. Cl. .................. 362/84; 362/219; 362/231
(58) Field of Classification Search ............ 362/293, 362/231, 219, 235, 84, 800, 260; 257/98; 313/501, 503, 502, 512, 506
See application file for complete search history.

(56) References Cited

U.S. PATENT DOCUMENTS

| 1,150,118 | A |   | 8/1915 | Hewitt |
| 1,275,871 | A |   | 8/1918 | Dodds et al. |
| 1,312,312 | A |   | 8/1919 | Dodds |
| 1,313,622 | A |   | 8/1919 | Dodds |
| 1,385,778 | A |   | 7/1921 | Dodds |
| 2,604,711 | A |   | 7/1952 | Porter |
| 3,780,462 | A |   | 12/1973 | Pregel et al. |
| 4,382,272 | A |   | 5/1983 | Quella et al. |
| 4,769,292 | A | * | 9/1988 | Tang et al. .............. 428/690 |
| 4,884,680 | A |   | 12/1989 | Israel et al. |
| 4,912,605 | A |   | 3/1990 | Whitehead |

(Continued)

OTHER PUBLICATIONS ifire Technology Press Release, Westaim's iFire Technology demonstrates high-luminance Color-by-Blue™, May 20, 2003 downloaded at http://www.ifire.com/NewsCentre/PressRelease.

(Continued)

*Primary Examiner*—Thomas M. Sember
(74) *Attorney, Agent, or Firm*—Stites & Harbison, PLLC; David W. Nagle, Jr.; Jeffrey A. Haeberlin (57) ABSTRACT

An illumination device simulates neon lighting and allows for emission of light in colors that cannot ordinarily be achieved by use of LEDs alone through the incorporation of a light color conversion system into the illumination device. This light color conversion system comprises an intermediate light-transmitting medium tinted with a predetermined combination of one or more fluorescent dyes. Light emitted from the light source of the illumination device is directed into the intermediate light-transmitting medium and interacts with the fluorescent dyes contained therein. This light is partially absorbed by each of the fluorescent dyes of the intermediate light-transmitting medium, and a lower-energy light is then emitted from each of the fluorescent dyes and into the light-receiving surface of the waveguide. Thus, selection of appropriate combinations of dyes results in various colors being emitted from the illumination device.

47 Claims, 6 Drawing Sheets

U.S. PATENT DOCUMENTS

| | | | |
|---|---|---|---|
| 5,607,222 | A | 3/1997 | Woog |
| 5,654,552 | A | 8/1997 | Toombs |
| 5,757,112 | A | 5/1998 | Van Dulmen |
| 5,998,925 | A * | 12/1999 | Shimizu et al. .............. 313/503 |
| 6,059,438 | A | 5/2000 | Smith et al. |
| 6,183,102 | B1 | 2/2001 | Mortz et al. |
| 6,276,634 | B1 | 8/2001 | Bodle |
| 6,319,425 | B1 * | 11/2001 | Tasaki et al. .......... 252/301.36 |
| 6,345,903 | B1 | 2/2002 | Koike et al. |
| 6,554,448 | B1 | 4/2003 | Carpenter et al. |
| 6,828,043 | B1 | 12/2004 | Sturley |
| 2001/0043467 | A1 | 11/2001 | Carpenter et al. |
| 2003/0085642 | A1 | 5/2003 | Pelka et al. |
| 2003/0095401 | A1 | 5/2003 | Hanson et al. |
| 2003/0189823 | A1 | 10/2003 | George et al. |
| 2004/0154199 | A1 | 8/2004 | Robinson et al. |
| 2004/0202893 | A1 | 10/2004 | Abe |
| 2004/0239243 | A1 * | 12/2004 | Roberts et al. .............. 313/512 |
| 2004/0244247 | A1 | 12/2004 | Bolta |

OTHER PUBLICATIONS

Details.aspx?id=56 on Aug. 5, 2003.

Neher, Dieter et al., Arbeitsgebiete und Methoden, Research fields, pp. 1-8, downloaded at http://www.uni-potsdam.de/u/physik/exphy/arbeit_eng.htm on Dec. 3, 2004.

IPEA/US, International Preliminary Examination Report, Oct. 7, 2004, pp. 1-4.

* cited by examiner

FIG.8

ILLUMINATION DEVICE FOR SIMULATING NEON LIGHTING THROUGH USE OF FLUORESCENT DYES

CROSS-REFERENCE TO RELATED APPLICATIONS

The present application claims priority to U.S. Provisional Application Ser. No. 60/387,076 filed Jun. 6, 2002 and is a continuation-in-part of U.S. Utility application Ser. No. 09/982,705 filed Oct. 18, 2001 now U.S. Pat. No. 6,592,238, the entire disclosures of which are incorporated herein by reference.

BACKGROUND OF THE INVENTION

The present invention relates to an illumination device for simulating neon lighting using high-intensity, low-voltage light sources, an illumination device ideally adapted for lighting, signage and advertising uses.

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness.

In an attempt to address some of the shortcomings of neon, co-pending and commonly assigned U.S. patent application Ser. No. 09/982,705, which has been incorporated in its entirety herein by reference, describes an illumination device comprising a profiled rod of material having waveguide properties that preferentially scatters light entering one lateral surface ("light-receiving surface") so that the resulting light intensity pattern emitted by another lateral surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. patent application Ser. No. 09/982,705 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is structural member that functions both as an optical waveguide and light scattering member. As a waveguide, it tends to preferentially direct light entering the waveguide, including the light entering a lateral surface thereof, along the axial direction of the waveguide, while as a light scattering member, it urges the light out of an opposite lateral surface of the waveguide. As a result, what is visually perceived is an elongated light pattern being emitted along the light-emitting lateral surface of the waveguide.

Nevertheless, a problem with illumination devices using leaky waveguides and LEDs, as described and claimed in U.S. patent application Ser. No. 09/982,705, is that the available visible color spectrum is limited by the finite availability of LED colors.

It is therefore the paramount object of the present invention to provide an illumination device that allows for emission of light in colors that cannot ordinarily be achieved by use of LEDs alone without significant increase in cost or complexity of the illumination device.

This and other objects and advantages of the present invention will become readily apparent and addressed through a reading of the discussion below and appended drawings.

SUMMARY OF THE PRESENT INVENTION

The present invention is an illumination device for simulating neon lighting through use of fluorescent dyes, thus allowing for emission of light in colors that cannot ordinarily be achieved by use of LEDs alone without significant increase in cost or complexity of the illumination device.

A preferred illumination device is generally comprised of a rod-like member, a housing, and a light source. In one preferred embodiment, the rod-like member is a waveguide that has an external curved lateral surface serving as a light-emitting surface and an interior lateral surface that serves as a light-receiving surface, such that light entering the waveguide from the light source positioned below the light-receiving surface is scattered within the waveguide so as to exit with diffused distribution out of the curved lateral surface.

The housing preferably comprises a pair of side walls that define an open-ended channel that extends substantially the length of the waveguide. The housing generally functions to house the light source and associated electrical accessories, and also preferably serves to collect and reflect light.

Although it is contemplated that various types of light sources could be incorporated into the illumination device of the present invention, a string or strings of contiguously mounted high-intensity light-emitting diodes (LEDs) is a preferred light source. However, since the available visible color spectrum of an illumination device incorporating LEDs as the light source is limited by the finite availability of LED colors, the illumination device of the present invention is constructed so as to provide for emission of light with a perceived color that is different than that of the LED itself. Specifically, this is accomplished through the incorporation of a light color conversion system into the illumination device, specifically an intermediate light-transmitting medium extending along and positioned adjacent the light source. This intermediate light-transmitting medium is preferably composed of a substantially translucent polyurethane or similar material tinted with a predetermined combination of one or more fluorescent dyes. Because of the position of the intermediate light-transmitting medium adjacent the light source, light emitted from the light source is directed into the intermediate light-transmitting medium and interacts with the fluorescent dyes contained therein. This light is partially absorbed by each of the fluorescent dyes of the intermediate light-transmitting medium, and a lower-energy light is then emitted from each of the fluorescent dyes and into the light-receiving surface of the waveguide. Thus, through selection of appropriate combinations of dyes and varying the density of the dyes within the intermediate light-transmitting medium, applicants have been able to produce various colors across the visible spectrum, colors that are ultimately observed along the light-emitting surface of the waveguide.

DETAILED DESCRIPTION OF THE PRESENT INVENTION

The present invention is an illumination device for simulating neon lighting through use of fluorescent dyes, thus allowing for emission of light in colors that cannot ordinarily be achieved by use of LEDs alone without significant increase in cost or complexity of the illumination device.

Figure 1:
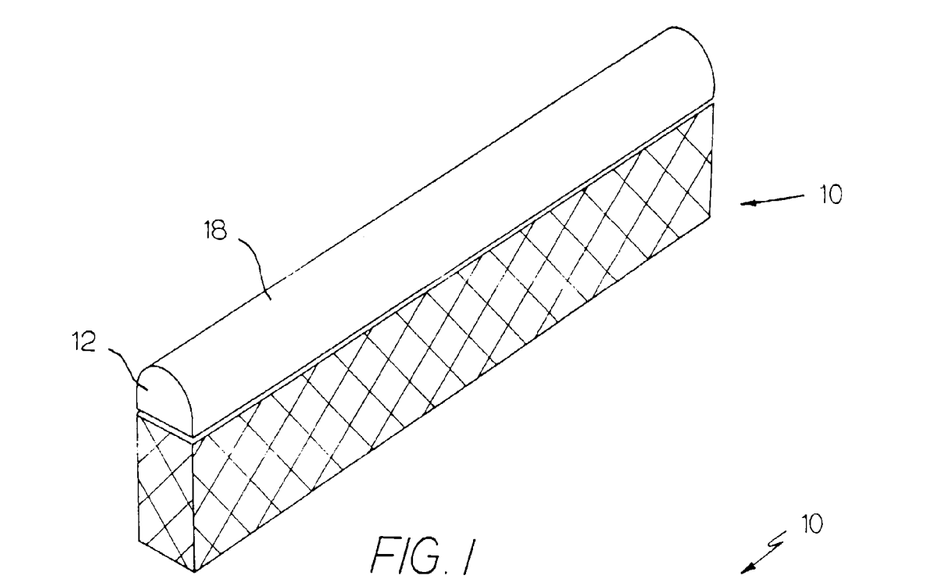
FIG. 1 is a perspective view of a preferred illumination device made in accordance with the present invention.
Figure 2:
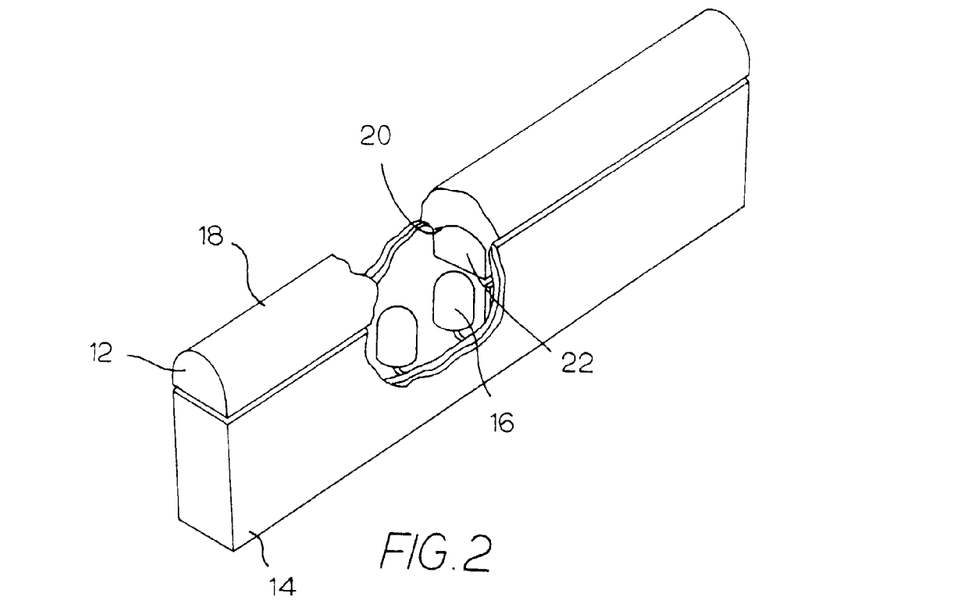
FIG. 2 is perspective view similar to that of FIG. 1, but with a portion broken away to show the interior of the illumination device.
Figure 3:
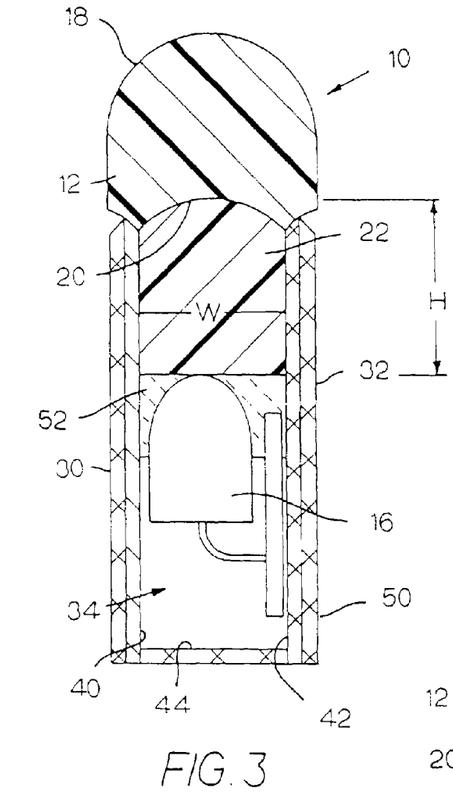
FIG. 3 is a cross-sectional view of the illumination device of FIG. 1.

A preferred illumination device 10 made in accordance with the present invention is illustrated in FIGS. 1–3. The illumination device 10 is generally comprised of a rod-like member 12, a housing 14, and an elongated light source 16. In this preferred embodiment, the rod-like member is a waveguide 12 that has an external curved lateral surface 18 serving as a light-emitting surface and an interior lateral surface 20 that serves as a light-receiving surface. The characteristics of this waveguide 12 will be further described below, but in general, light entering the waveguide 12 from the light source 16 positioned below the light-receiving surface 20 is scattered within the waveguide 12 so as to exit with diffused distribution out of the curved lateral surface 18.

As best shown in FIG. 3, the housing 14 preferably comprises a pair of side walls 30, 32 that define an open-ended channel 34 that extends substantially the length of waveguide 12. The housing 14 generally functions to house the light source 16 and associated electrical accessories (e.g., a circuit board), and also preferably serves to collect and reflect light, as is further described below.

Although it is contemplated that various types of light sources could be incorporated into the illumination device of the present invention, applicants have determined that the best available light source for the purposes of this invention is a string or strings of contiguously mounted high-intensity light-emitting diodes (LEDs), as illustrated in FIGS. 1–3. However, as mentioned above, the available visible color spectrum of an illumination device 10 incorporating LEDs as the light source 16 is limited by the finite availability of LED colors. Furthermore, certain LED colors are significantly more expensive than others and/or have life spans that are significantly shorter than others. Thus, the illumination device 10 of the present invention is constructed so as to provide for emission of light with a perceived color that is different than that of the LED itself.

This is accomplished through the incorporation of a light color conversion system into the illumination device 10, specifically an intermediate light-transmitting medium 22 extending along and positioned adjacent the light source 16 with a light-receiving surface for receiving light emitted from said light source 16 and a light-emitting surface for emitting light into the waveguide 12. This intermediate light-transmitting medium 22 is preferably composed of a matrix of a substantially translucent polyurethane or similar material tinted with a predetermined combination of one or more fluorescent dyes. A preferred polyurethane for this application is a polyurethane manufactured and distributed by IPN Industries, Inc. of Haverhill, Mass. under trade name EGA-202. However, as will be further described below with reference to FIG. 3A, the intermediate light-transmitting medium 22 need not be a unitary member, but may also be comprised of a plurality of discrete layers.

In order to better understand the construction and function of the illumination device 10 of the present invention, it is useful to discuss the concept of fluorescence. Fluorescence is the emission of certain electromagnetic radiation (i.e., light) from a body that results from the incidence of electromagnetic radiation on that body. In other words, if light energy is directed into a fluorescent body, that body absorbs some of the energy and then emits light of a lesser energy; for example, blue light that is directed onto a fluorescent body may emit a lower-energy green light.

Returning to the illumination device 10 of the present invention, the intermediate light-transmitting medium 22 and the fluorescent dyes contained therein serve as the fluorescent body. Specifically, because of its position adjacent the light source 16, light emitted from the light source 16 is directed into the intermediate light-transmitting medium 22 and interacts with the fluorescent dyes contained therein. This light is partially absorbed by each of the fluorescent dyes of the intermediate light-transmitting medium 22, and a lower-energy light is then emitted from each of the fluorescent dyes and into the light-receiving surface 20 of the waveguide 12. Thus, through selection of appropriate combinations of dyes and varying the density of the dyes within the intermediate light-transmitting medium 22, applicants have been able to produce various colors across the visible spectrum, colors that are ultimately observed along the light-emitting surface 18 of the waveguide 12.

Figures 7A, 7B:
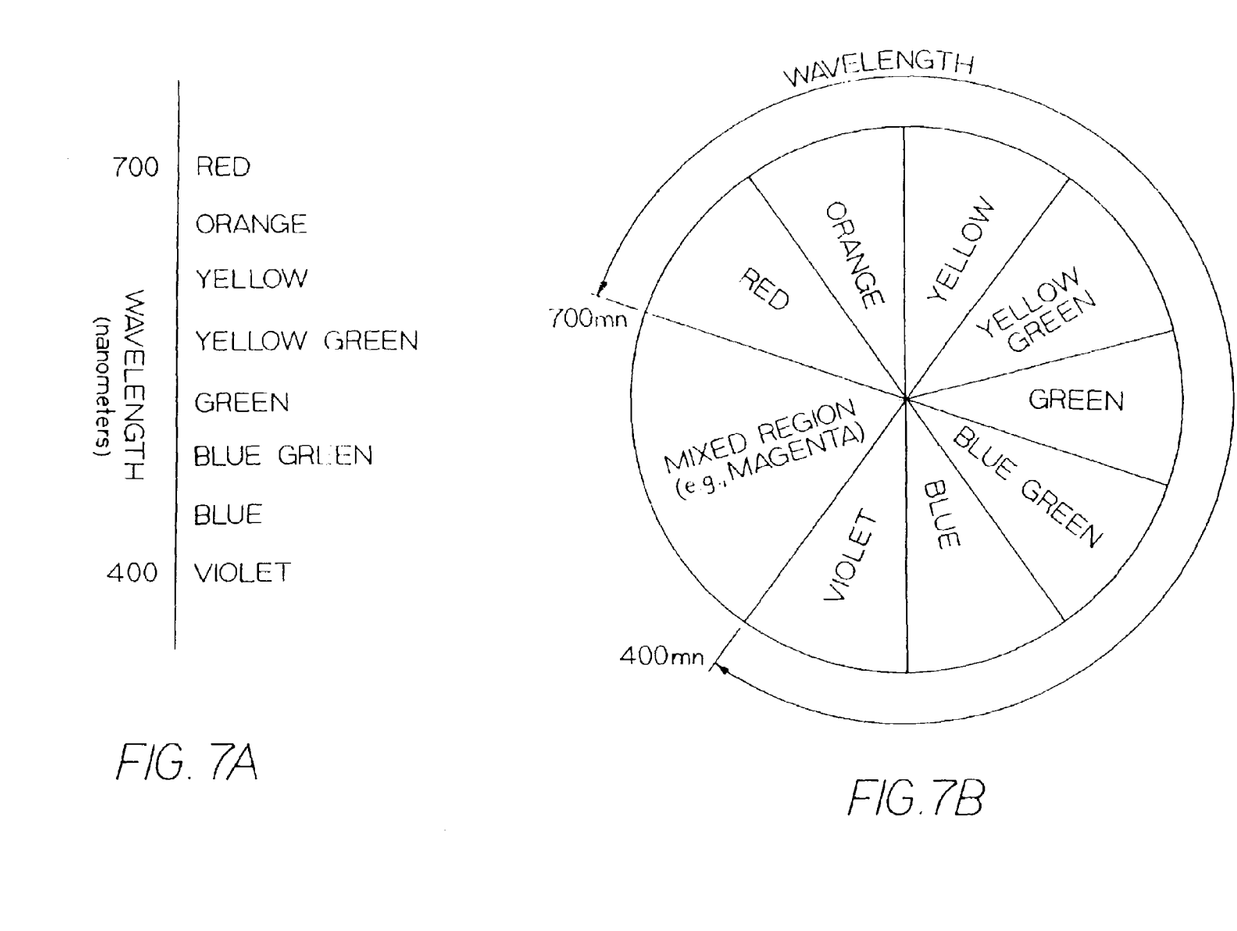
FIG. 7A illustrates the visible spectrum as a continuum of colors from violet (~400 nm) to red (~700 nm)
FIG. 7B illustrates the visible spectrum in a circular chart.

For example, blue LEDs are significantly less expensive than white LEDs, but last significantly longer than white LEDs. Furthermore, because blue light is a higher-energy light, applying the principles of fluorescence in accordance with the present invention, blue LEDs can be used to generate colors across the visible spectrum, from blue-green to red, as illustrated in FIGS. 7A and 7B. Therefore, blue LEDs are a preferred LED color for the illumination device 10 of the present invention.

Thus, in an illumination device 10 incorporating blue LEDs and constructed in accordance with the present invention, various combinations of fluorescent dyes, including, but not limited to, red, yellow, and/or green dyes, can be incorporated into the intermediate light-transmitting medium 22 to achieve different colors. In this regard, a preferred red fluorescent dye is a pigment manufactured and distributed by Day-Glo Color Corporation of Cleveland, Ohio as Product No. ZQ-13 ("Rocket Red™"); a preferred yellow fluorescent dye is a pigment manufactured and distributed by Day-Glo Color Corporation of Cleveland, Ohio as Product No. ZQ-17 ("Saturn Yellow™"); and a preferred green fluorescent dye is a pigment manufactured and distributed by Day-Glo Color Corporation of Cleveland, Ohio as Product No. ZQ-18 ("Signal Green™").

Before describing particular dye combinations for producing desired colors, it is important to recognize the nature of visible light and color. At the outset, visible light is light than can be perceived by the human eye. Visible light spans a range of wavelengths between approximately 400–700 nanometers (nm) (referred to as the "visible spectrum"), and the perceived color of light is based on its particular wavelength within this range. As illustrated in FIGS. 7A and 7B, the visible spectrum can be represented as a continuum or "rainbow" of colors from violet (~400 nm) to red (~700 nm), or alternatively, the visible spectrum can be represented in a circular chart. With respect to FIGS. 7A and 7B, it is important to recognize that many common colors are not represented in visible spectrum. For example, the color magenta is not represented by a single wavelength; rather, when the human eye perceives magenta, it is actually perceiving a combination of wavelengths in the red and violet ranges of the visible spectrum, and thus it is represented in the mixed region of the circular chart of FIG. 7B. Similarly, it is important to recognize that the color commonly referred to as white is not represented in FIGS. 7A or 7B. When the human eye perceives white, it is actually perceiving a combination of wavelengths across the visible spectrum, the importance of which will be explained below.

Figure 8:
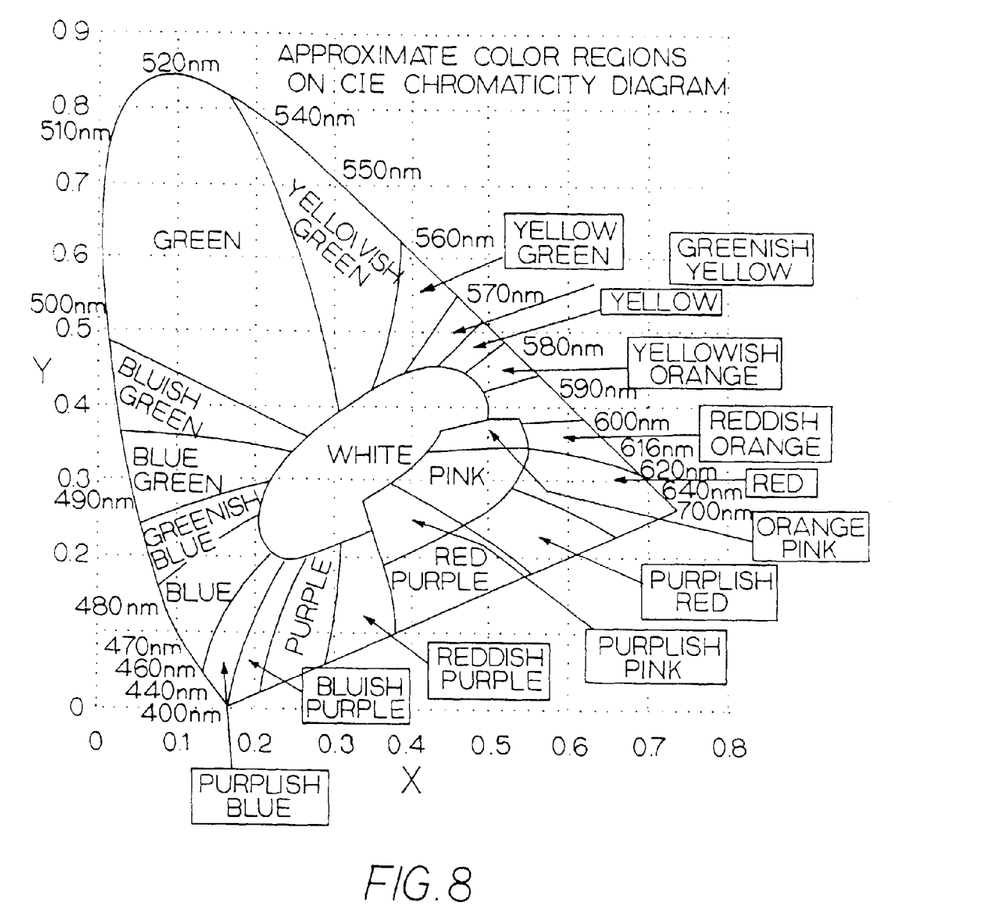
FIG. 8 is an illustration of the CIE Chromaticity Diagram.

Thus, most perceived "colors" are not representative of light of a single wavelength, but rather some combination of wavelengths. In this regard, the dominant color in light comprised of some combination of wavelengths is generally referred to as hue. In order to provide a mechanism to represent and identify all possible perceived colors, the Commission Internationale l'Eclairage (CIE) constructed the CIE Chromaticity Diagram, which is based on three ideal primary light colors of red, blue, and green. The CIE Chromaticity Diagram is a well-known tool for identifying colors and is well understood by one of ordinary skill in the art. Specifically, as illustrated in FIG. 8, the x-axis of this chart represents the amount of ideal red that would be mixed with ideal blue, and the y-axis of this chart represents the amount of ideal green that would be mixed with ideal blue. Thus, using the CIE Chromaticity Diagram, a desired color can be identified in terms of its x and y coordinates. It is also important to recognize that the chromaticity curve, which is representative of the visible spectrum, is commonly superimposed over the chart such that wavelengths within the visible spectrum are represented along this curve.

The CIE Chromaticity Diagram is also helpful in understanding mixtures of primary light colors. Specifically, if a straight line is drawn between two points on the chromaticity curve, for example from green with a wavelength of 510 nm to red with a wavelength of 700 nm, that straight line illustrates the range of colors that could be created and perceived by the human eye, depending on the relative amounts of primary light colors in the mixture, including various yellowish-green colors and oranges.

It is also important to recognize that the central region of the CIE Chromaticity Diagram is representative of white, a combination of the three ideal primary light colors. If any straight line between two colors on the chromaticity curve passes through this central region, those two colors can be mixed to create a perceived white color.

Again, through selection of appropriate combinations of dyes and varying the density of the dyes within the intermediate light-transmitting medium 22, applicants have been able to produce various colors across the visible spectrum, color that are observed along the light-emitting surface 18 of the waveguide 12. Various examples are described below.

EXAMPLE 1

In this first example, an illumination device 10 is constructed with a length L of approximately 4.75 inches and has a cross-section as shown in FIG. 3. The light source 16 is a string of nine contiguously mounted, high-intensity LEDs spaced at approximately 0.50-inch intervals. Furthermore and more importantly, the LEDs in the example are blue, emitting light with a wavelength of approximately 470 nm and having color coordinates of x≅0.111 and y≅0.058 on the CIE Chromaticity Diagram.

The LEDs are operated at approximately 20 mA. In order to simplify the manufacturing and assembly process, it is preferred that the LEDs be operated at a substantially constant current and power. However, by varying the current, the resultant perceived color may be affected.

Finally, referring again to FIG. 3, the intermediate light-transmitting medium 22 in this example has a height H of approximately 0.625 inches, a width W of approximately 0.375 inches, and a length essentially identical to that of the illumination device, 4.75 inches. More importantly, the intermediate light-transmitting medium 22 is composed of a substantially translucent polyurethane tinted with combination of fluorescent dyes, preferably and specifically the red, yellow, and green dyes manufactured and distributed by the Day-Glo Color Corporation of Cleveland. Ohio, in the following proportions:

TABLE 1

|  | Mass (g) |
| --- | --- |
| Polyurethane | 246.0 |
| Red Fluorescent Dye | 0.11 |
| Yellow Fluorescent Dye | 0.17 |
| Green Fluorescent Dye | 0.02 |

With respect to Table 1 (and the analogous tables contained in other examples), the polyurethane and fluorescent dyes are mixed into a substantially homogenous compound. Once so mixed, the compound is used to create an intermediate light-transmitting medium 22 of appropriate dimensions. Therefore, the total mass of the polyurethane and fluorescent dyes is not important, only the relative ratios of these components in the composition.

When a preferred illumination device 10 is constructed in this manner, light emitted from the light source 16 (i.e., the blue LEDs) is directed into the intermediate light-transmitting medium 22 and interacts with the red, yellow, and green fluorescent dyes contained therein. This light is partially absorbed by each of the fluorescent dyes of the intermediate light-transmitting medium 22, and a lower-energy light is then emitted from each of the fluorescent dyes and into the light-receiving surface 20 of the waveguide 12. Thus, a combination of lights of various wavelengths from each of the fluorescent dyes and the LEDs themselves is directed into the light-receiving surface 20 of the waveguide 12 and ultimately observed along the light-emitting surface 18 of the waveguide 12.

Specifically, it has been determined that the illumination device 10 described in this example results in light with color coordinates of $x \approx 0.266$ and $y \approx 0.237$, within the white region defined by the CIE Chromaticity diagram as illustrated in FIG. 8. Thus, blue light emitted from the LEDs 16 ultimately results in a white light being observed along the light-emitting surface 18 of the waveguide 12.

EXAMPLE 2

In this example, an illumination device 10 is constructed with a length L of approximately 4.625 inches and also has a cross-section similar to that shown in FIG. 3. The light source 16 is a string of nine contiguously mounted, high-intensity LEDs spaced at approximately 0.50-inch intervals and operated at approximately 20 mA. Furthermore, the LEDs in the example are again blue, emitting light with a wavelength of approximately 470 nm and having color coordinates of $x \approx 0.111$ and $y \approx 0.058$ on the CIE Chromaticity Diagram.

Referring again to FIG. 3, the intermediate light-transmitting medium 22 in this example has a height H of approximately 0.375 inches, a width W of approximately 0.1875 inches, and a length essentially identical to that of the illumination device, 4.625 inches. The intermediate light-transmitting medium 22 is composed of a substantially translucent polyurethane tinted with a combination of fluorescent dyes in the following proportions:

TABLE 2

|  | Mass (g) |
| --- | --- |
| Polyurethane | 245.0 |
| Red Fluorescent Dye | 0.12 |
| Yellow Fluorescent Dye | 0.17 |
| Green Fluorescent Dye | 0.02 |

When a preferred illumination device 10 is constructed in this manner, blue light emitted from the LEDs 16 ultimately results in light having color coordinates of $x \approx 0.255$ and $y \approx 0.211$. Thus, the observed light falls near the upper boundary of the bluish purple and purple regions of the CIE Chromaticity Diagram, as illustrated in FIG. 8.

EXAMPLE 3

In this example, an illumination device 10 is constructed with a length L of approximately 3.00 inches and also has a cross-section similar to that shown in FIG. 3. The light source 16 is a string of six contiguously mounted, high-intensity LEDs spaced at approximately 0.50-inch intervals and operated at approximately 20 mA. Furthermore, the LEDs in the example are again blue, emitting light with a wavelength of approximately 470 nm and having color coordinates of $x \approx 0.111$ and $y \approx 0.058$ on the CIE Chromaticity Diagram.

Referring again to FIG. 3, the intermediate light-transmitting medium 22 in this example has a height H of approximately 0.400 inches, a width W of approximately 0.1875 inches, and a length essentially identical to that of the illumination device, 3.00 inches. The intermediate light-transmitting medium 22 is composed of a substantially translucent polyurethane tinted with a combination of fluorescent dyes in the following proportions:

TABLE 3

|  | Mass (g) |
| --- | --- |
| Polyurethane | 260.0 |
| Red Fluorescent Dye | 0.13 |
| Yellow Fluorescent Dye | 0.15 |
| Green Fluorescent Dye | 0.005 |

When a preferred illumination device 10 is constructed in this manner, blue light emitted from the LEDs 16 ultimately results in light having color coordinates of $x \approx 0.327$ and $y \approx 0.247$. Thus, the observed light falls near the upper boundary of the reddish purple and purplish pink regions of the CIE Chromaticity Diagram, as illustrated in FIG. 8.

As mentioned above, light emitted from the fluorescent dyes contained in the intermediate light-transmitting medium 22 is transmitted through the intermediate light-transmitting medium 22 to the light-receiving surface 20 of the rod-like member 12. In this regard, as with the illumination device described in co-pending and commonly assigned U.S. patent application Ser. No. 09/982,705, the rod-like member 12 of the present invention is preferably a "leaky" waveguide 12, i.e., a structural member that functions both as an optical waveguide and light scattering member. As an optical waveguide, it tends to preferentially direct light entering the waveguide 12 along the axial direction of the waveguide, while as a light scattering member, it urges the light out of its light-emitting surface 18. In other words, light enters the light-receiving surface 20 of the waveguide 12 from the adjacent intermediate light-transmitting medium 22 and is directed along at least a portion of the length of the waveguide 12 before being emitted from the light-emitting surface 18 of the waveguide 12. As a result, what is visually perceived is a substantially uniform and elongated light pattern being emitted along the light-emitting surface 18 of the waveguide 12, thus making the illumination device 10 an effective simulator of neon lighting.

As described in co-pending and commonly assigned U.S. patent application Ser. No. 09/982,705, applicants have found that acrylic material appropriately treated to scatter light to be one preferred material for the waveguide 12. Moreover, such acrylic material is easily molded or extruded into rods having the desired shape for a particular illumination application, is extremely light in weight, and withstands rough shipping and handling. While acrylic material having the desired characteristics is commonly available, it can be obtained, for example, from AtoHaas of Philadelphia, Pa. under order number DR66080 with added frosted characteristics. Alternatively, other materials, such as such as bead-blasted acrylic or polycarbonate, or painted acrylic or polycarbonate, may also be used for the waveguide 12 without departing from the spirit and scope of the present invention.

As an alternative, applicants have also determined that filler may be incorporated into a polyurethane material to give it the desired light scattering properties and allow to serve as an appropriate leaky waveguide 12. Preferably, hollow spheres, called "micro balloons," are used to promote scattering. The micro balloons have approximately the same diameter as a human hair, are void in their interior, and have a shell constructed from glass or other material having an index of refraction similar to that of polyurethane. Because the indices of refraction essentially match, once the micro balloons are placed in the polyurethane, the Fresnel losses at the interfaces are minimal. When light passes through the polyurethane material impregnated with micro balloons, the voids within the respective micro balloons act as a negative focusing lens, deflecting the light. Thus, once impregnated with appropriate micro-balloons, a polyurethane compound will also have the light scattering properties necessary for it to serve as the leaky waveguide 12 for the illumination device 10 of the present invention.

Figure 6:
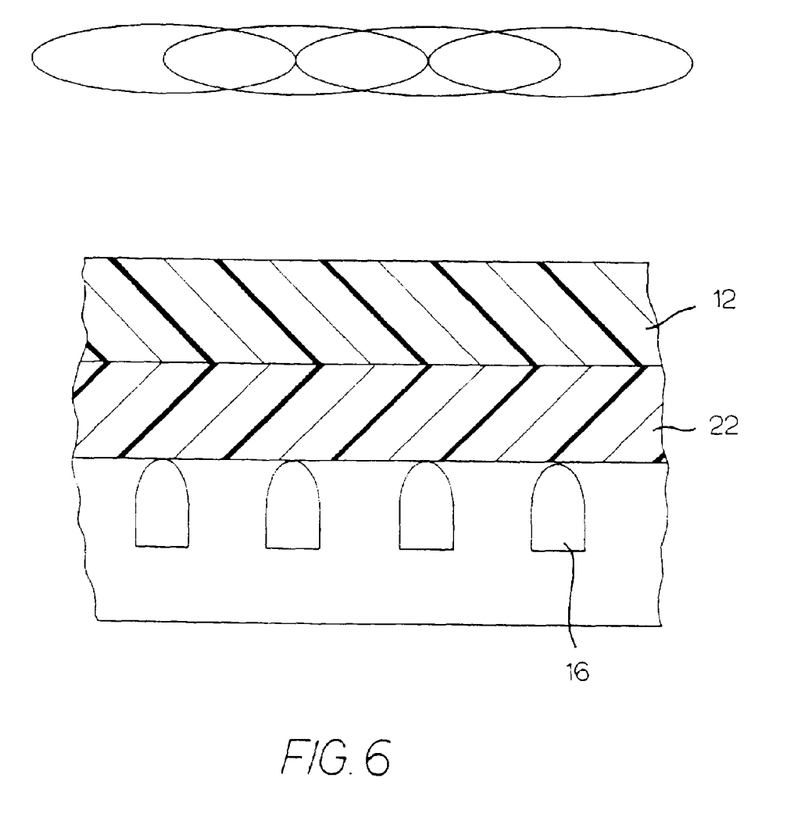
FIG. 6 is a Mercator-like, top projection of the illumination device of FIG. 1, illustrating the overlapping, individual light distribution patterns.

Regardless of the specific material chosen for construction of the waveguide 12, as illustrated in FIG. 6, the waveguide 12 preferentially scatters light along its length but ultimately allows light to exit through its light-emitting surface 18. Such a waveguide 12 provides a visible, elongated or oval-like light pattern for each LED, brightest at the center and diminishing continuously out from the center along the major and minor axes of the pattern. By spacing the LEDs a certain distance apart and each LED an appropriate distance from the light-emitting surface 18 of the waveguide 12, the light intensity distribution patterns on the light-emitting surface 18 of the waveguide 12 are caused to overlap to such an extent that the variations in the patterns are evened out. This causes the collective light pattern on the light-emitting surface 18 of the waveguide 12 to appear uniform along the length of the waveguide 12.

With respect to the scattering of light so as to cause it to appear uniform along the length of the waveguide 12, it is noteworthy that the dyes of the intermediate light-transmitting medium 22 also tend to cause scattering of the light emitted from the light source 16. Thus, the incorporation of the intermediate light-transmitting medium 22 not only provides for the desired emission of light of a perceived color different than that of the light source 16, it also causes some scattering of light and thus assists in ensuring that the collective light pattern on the light-emitting surface 18 of the waveguide 12 appears uniform.

As mentioned above, the housing 14 generally functions to house the light source 16 and associated electrical accessories, and also preferably serves to collect light not emitted directly into the light-receiving surface of the intermediate light-transmitting medium 22, re-directing such light it to the intermediate light-transmitting medium 22, as is further described below. Specifically, the housing 14 increases the light collection efficiency by reflecting the light incident upon the internal surfaces of the housing 14 into the intermediate light-transmitting medium 22. In this regard, as best shown in FIG. 3, the illumination device 10 is preferably provided with one or more collection surfaces 40, 42, 44 for collecting and reflecting light not emitted directly into the intermediate light-transmitting medium 22. The collection surfaces 40, 42, 44 could be formed using tape, paint, metal or another light-reflecting material, preferably white in color. It is preferred that such light collection surfaces 40, 42, 44 be provided on the internal surfaces of the channel 34, namely, the side walls 30, 32 and portions of the floor of the channel 34. It is additionally preferred that the external surfaces of the side walls 30, 32 be provided with a light-absorbing material 50, for example, tape, paint, or another coating, preferably black in color. Thus, the external surfaces of the housing 14 are visually dark to an observer or otherwise prevent "leakage" of the light emitted from the light source 16.

As a further refinement, and as illustrated in FIG. 3, a portion of the volume of the open-ended channel 34 is filled with a translucent potting compound 52 such that the LEDs 16 are partially encapsulated in the potting compound 52. In such an embodiment, the light is transmitted through the potting compound 52 before entering the light-receiving surface of the intermediate light-transmitting medium 22. When such a potting compound 52 is incorporated into an illumination device 10 constructed in accordance with the present invention, the potting compound 52 should have an index of refraction essentially matching the index of refraction of the light source 16 to minimize Fresnel losses at the interface.

Furthermore, it is contemplated that the potting compound 52 could completely fill the channel 34 defined by the side walls 30, 32 in order to provide the illumination device 10 with greater rigidity and to maintain the proper positioning of the LEDs 16 within the channel 34.

Figure 3A:
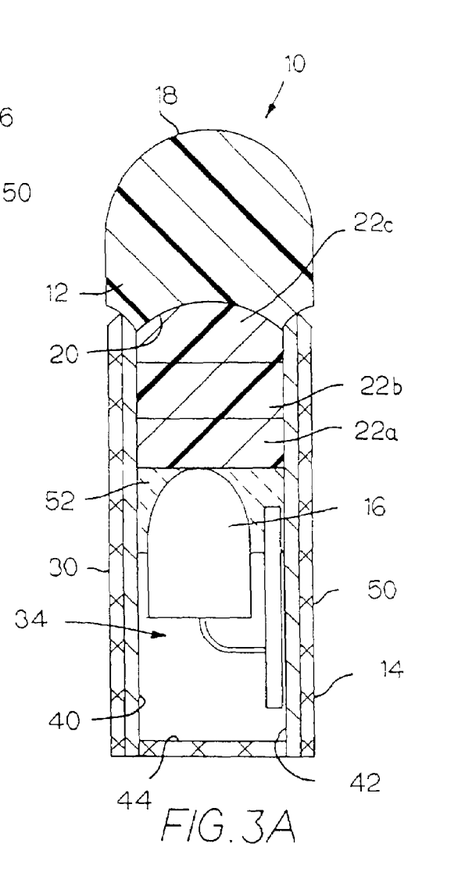
FIG. 3A is a cross-sectional view similar to that of FIG. 3, but wherein the intermediate light-transmitting medium is comprised of multiple discrete layers.

FIG. 3A is a cross-sectional view similar to that of FIG. 3, but in which the intermediate light-transmitting medium 22 is comprised of multiple discrete layers. Specifically, the embodiment illustrated in FIG. 3A is identical to that illustrated in FIG. 3, with the exception that the intermediate light-transmitting medium 22 is comprised of three discrete layers 22a, 22b, 22c. Each of the individual layers 22a, 22b, 22c could be tinted with a single dye (i.e., a red layer 22a, a yellow layer 22b, and a green layer 22c), but once stacked, the layers 22a, 22b, 22c work together to achieve the desired result—emission of light of a perceived color different than that of the light source 16. In this regard, although the intermediate light-transmitting medium 22 described above was preferably composed of a substantially translucent polyurethane, other materials could be used without departing from the spirit and scope of the present invention. For example, it is contemplated that the intermediate light-transmitting medium 22 could be comprised of one or more layers of a light-transmitting fluorescent paint or paste applied to the light-receiving surface 20 of the waveguide 12 to achieve the desired fluorescence. For another example, substantially translucent and colored plastic strips could be applied to the light-receiving surface 20 of the waveguide 12 for the desired fluorescence.

Figures 4, 5:
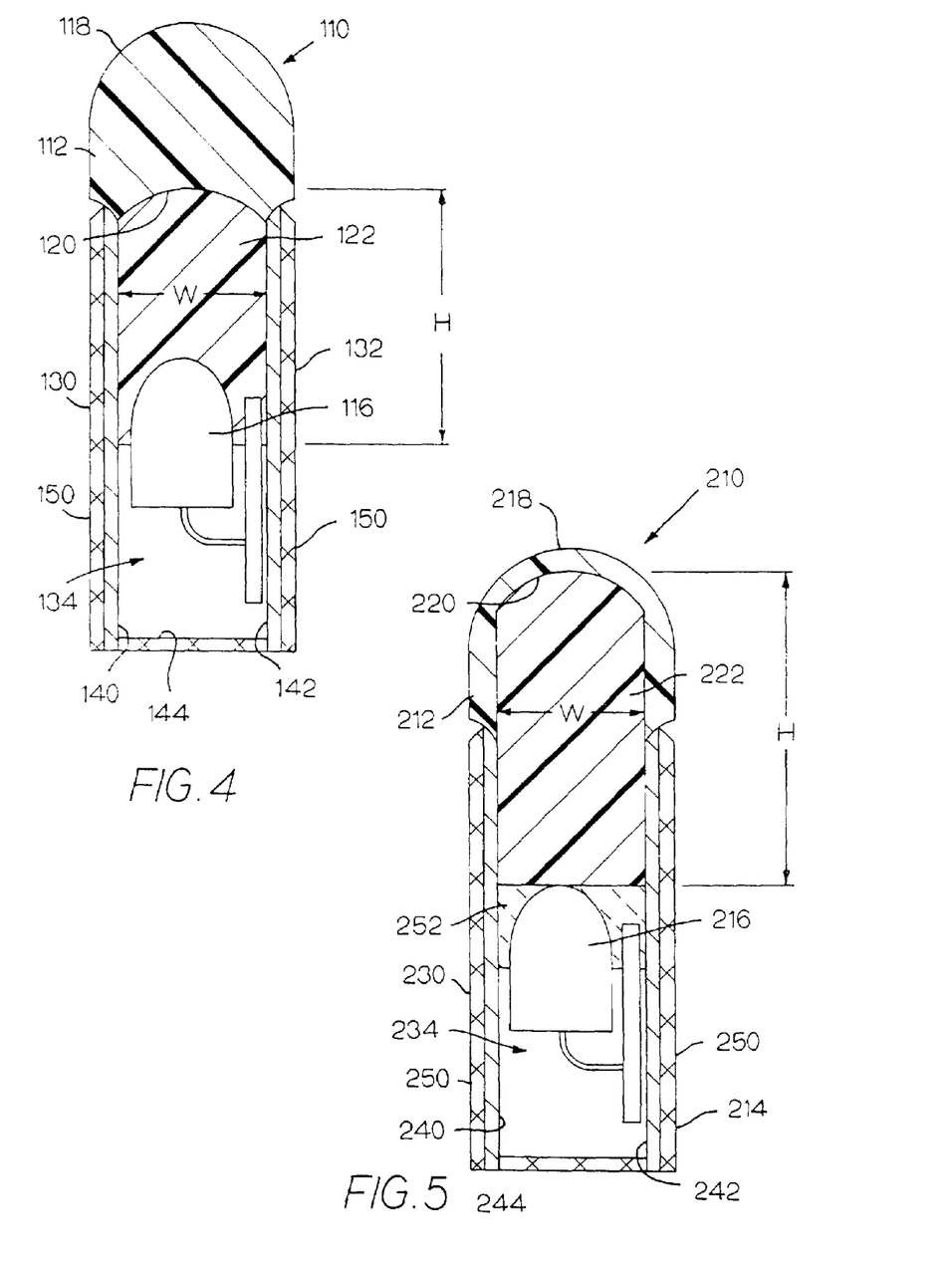
FIG. 4 is a cross-sectional view of an alternate preferred embodiment of an illumination device made in accordance with the present invention.
FIG. 5 is a cross-sectional view of another alternate preferred embodiment of an illumination device made in accordance with the present invention.

FIG. 4 is a side sectional view of an alternate preferred embodiment of an illumination device 110 made in accordance with the present invention. Like the embodiment described above with respect to FIG. 3, the illumination device 110 is generally comprised of a rod-like member 112, a housing 114, and a light source 116 (e.g., contiguously mounted high-intensity LEDs). The rod-like member is a waveguide 112 that preferably has an external curved lateral surface 118 serving as a light-emitting surface and an interior lateral surface 120 that serves as a light-receiving surface. The rod-like member 112 has optical waveguide and light scattering. properties, such that light entering the waveguide 112 positioned below the light-receiving surface 120 is scattered within the waveguide 112 so as to exit with diffused distribution out of the curved lateral surface 118.

The illumination device 110 further includes a light color conversion system, specifically an intermediate light-transmitting medium 122 tinted with a predetermined combination of one or more fluorescent dyes. However, unlike the embodiment described above with respect to FIG. 3, the LEDs 116 are not only adjacent to the intermediate light-transmitting medium 122, but actually extend into the intermediate light-transmitting medium 122.

As with the embodiment described above with respect to FIG. 3, the housing 114 preferably comprises a pair of side walls 130, 132 that define an open-ended channel 134 that extends substantially the length of waveguide 112. The housing 114 generally functions to house the light source 116 and associated electrical accessories, and also preferably serves to collect and reflect light. Specifically, the housing 114 increases the light collection efficiency by reflecting the light incident upon the internal surfaces of the housing 114 into the intermediate light-transmitting medium 122. In this regard, the illumination device 110 is preferably provided with one or more collection surfaces 140, 142, 144 for collecting and reflecting light not emitted directly into the intermediate light-transmitting medium 122. It is additionally preferred that the external surfaces of the side walls 130, 132 be provided with a light-absorbing material 150.

In any event, because of the position of the intermediate light-transmitting medium 122 adjacent the light source 116, light emitted from the light source 116 is directed into the intermediate light-transmitting medium 122 and interacts with the fluorescent dyes contained therein. This light is partially absorbed by each of the fluorescent dyes of the intermediate light-transmitting medium 122, and a lower-energy light is then emitted from each of the fluorescent dyes and into the light-receiving surface 120 of the waveguide 112. Thus, through selection of appropriate combinations of dyes and varying the density of the dyes within the intermediate light-transmitting medium 122, various colors can be created and observed along the light-emitting surface 118 of the waveguide 112.

FIG. 5 is a side sectional view of another alternate preferred embodiment of an illumination device 210 made in accordance with the present invention. Like the embodiments described above with respect to FIGS. 3 and 4, the illumination device 210 is generally comprised of a rod-like member 212 that defines an internal channel, a housing 214, and a light source 216 (e.g., contiguously mounted high-intensity LEDs). The rod-like member is a waveguide 212 that preferably has an external curved lateral surface 218 serving as a light-emitting surface and an interior lateral surface 220 that serves as a light-receiving surface. The rod-like member 212 has optical waveguide and light scattering properties, such that light entering the waveguide 212 positioned below the light-receiving surface 220 is scattered within the waveguide 212 so as to exit with diffused distribution out of the curved lateral surface 218.

The illumination device 210 further includes a light color conversion system, specifically an intermediate light-transmitting medium 222 received in the internal channel defined by said waveguide 212 and tinted with a predetermined combination of one or more fluorescent dyes. Like the embodiment described with respect to FIG. 3, the LEDs 216 are partially encapsulated in a potting compound 252 and positioned adjacent the light-receiving surface of the intermediate light-transmitting medium 222. However, in this particular embodiment, the intermediate light-transmitting medium 222 has a substantially "taller" profile, and the waveguide 212 is much thinner than in the other described embodiments.

Finally, as with the embodiments described above with respect to FIGS. 3 and 4, the housing 214 preferably comprises a pair of side walls 230, 232 that define an open-ended channel 234 that extends substantially the length of waveguide 212. The housing 214 generally functions to house the light source 216 and associated electrical accessories, and also preferably serves to collect and reflect light. Specifically, the housing 214 increases the light collection efficiency by reflecting the light incident upon the internal surfaces of the housing 214 into the intermediate light-transmitting medium 222. In this regard, the illumination device 210 is preferably provided with one or more collection surfaces 240, 242, 244 for collecting and reflecting light not emitted directly into the intermediate light-transmitting medium 222. It is additionally preferred that the external surfaces of the side walls 230, 232 be provided with a light-absorbing material 250.

In any event, because of the position of the intermediate light-transmitting medium 222 adjacent the light source 216, light emitted from the light source 216 is directed into the intermediate light-transmitting medium 222 and interacts with the fluorescent dyes contained therein. This light is partially absorbed by each of the fluorescent dyes of the intermediate light-transmitting medium 222, and a lower-energy light is then emitted from each of the fluorescent dyes and into the light-receiving surface 220 of the waveguide 212. Thus, through selection of appropriate combinations of dyes and varying the density of the dyes within the intermediate light-transmitting medium 222, various colors can be created and observed along the light-emitting surface 218 of the waveguide 212.

Finally, as part of their experimentation, applicants have further discovered that ultraviolet light commonly emitted from LEDs 16 may adversely affect the performance of the fluorescent dyes of the intermediate light-transmitting medium 22. Therefore, one solution to this problem is to use ultraviolet inhibitors in the polyurethane compound that comprises the intermediate light-transmitting medium 22 and/or the potting compound 52. Alternatively, it is also contemplated that an acrylic shield could be positioned between the LEDs 16 and the intermediate light-transmitting medium 22 to absorb any ultraviolet radiation and prevent it from entering the intermediate light-transmitting medium 22.

It will be obvious to those skilled in the art that further modifications may be made to the embodiments described herein without departing from the spirit and scope of the present invention.

The inventin claimed is:

1. An illumination device, comprising:
   a light source emitting light of a predetermined first hue;
   a substantially rod-like member having a predetermined length and positioned adjacent said light source, said member being composed of a material that has both optical waveguide and light scattering properties so as to preferentially scatter light along the length of said rod-like member; and
   an intermediate member generally composed of a matrix of light-transmitting material and one or more light-fluorescing dyes, said intermediate member including a light-receiving surface for receiving light emitted from said light source and a light-emitting surface for emitting light into said rod-like member, each of said light-fluorescing dyes emitting light of a predetermined wavelength following absorption of light from said light source, wherein a collective light ultimately emitted from said rod-like member is of a second hue with a substantially uniform intensity along the length of said rod-like member.

2. The illumination device as recited in claim 1, wherein the predetermined hue of said light source is blue.

3. The illumination device as recited in claim 2, wherein said second hue is substantially white.

4. The illumination device as recited in claim 1, wherein said second hue is substantially white.

5. The illumination device as recited in claim 1, wherein said light source is a plurality of light-emitting diodes.

6. The illumination device as recited in claim 1, and further comprising a housing extending substantially the predetermined length of said rod-like member and housing said light source and associated electrical accessories.

7. The illumination device as recited in claim 6, wherein said housing generally comprises a pair of side walls that define an open-ended channel, said light source being received and housed in said open-ended channel.

8. The illumination device as recited in claim 7, and further comprising one or more collection surfaces provided on internal surfaces of said side walls, said light collection surfaces collecting and reflecting light into said intermediate member.

9. The illumination device as recited in claim 7, wherein external surfaces of said side walls are provided with a light-absorbing material.

10. The illumination device as recited in claim 6, and further comprising one or more light collection surfaces provided on internal surfaces of said housing, said light collection surfaces collecting and reflecting light into said intermediate member.

11. The illumination device as recited in claim 1, wherein the matrix of light-transmitting material is polyurethane.

12. An illumination device, comprising:
   a plurality of light-emitting diodes emitting light of a predetermined first color; and
   a light color conversion system, including
      a light-receiving surface positioned adjacent said light-emitting diodes,
      a light-emitting surface, and
      one or more fluorescent dyes, each of said dyes emitting light of one or more predetermined wavelengths following absorption of light from said light-emitting diodes and from other of said fluorescent dyes, wherein light observed along the light-emitting surface of said light color conversion system is perceived as having a color different than the predetermined first color of light emitted by said light-emitting diodes; and
      a substantially rod-like member having a predetermined length with a light-receiving surface and a light-emitting surface, the light-receiving surface of said rod-like member being positioned adjacent the light-emitting surface of said light color conversion system.

13. The illumination device as recited in claim 12, wherein the predetermined first color is blue.

14. The illumination device as recited in claim 13, wherein light observed along the light-emitting surface of said light color conversion system is perceived as white light by an observer.

15. The illumination device as recited in claim 13, wherein light observed along the light-emitting surface of said light color conversion system has color coordinates within the white region defined by the CIE Chromaticity diagram.

16. The illumination device as recited in claim 12, wherein light observed along the light-emitting surface of said light color conversion system is perceived as white light by an observer.

17. The illumination device as recited in claim 12, wherein light observed along the light-emitting surface of said light color conversion system has color coordinates within the white region defined by the CIE Chromaticity diagram.

18. The illumination device as recited in claim 12, wherein said substantially rod-like member is composed of a material that has both optical waveguide and light scattering properties, resulting in an elongated and substantially uniform light intensity pattern on the light-emitting surface of said rod-like member along said predetermined length.

19. The illumination device as recited in claim 12, and further comprising a housing extending substantially the predetermined length of said rod-like member and housing said plurality of light-emitting diodes and associated electrical accessories.

20. The illumination device as recited in claim 19, wherein said housing generally comprises a pair of side walls that define an open-ended channel, said plurality of light-emitting diodes being received and housed in said open-ended channel.

21. The illumination device as recited in claim 20, and further comprising one or more collection surfaces provided on internal surfaces of said side walls, said light collection surfaces collecting and reflecting light into said light color conversion system.

22. The illumination device as recited in claim 20, wherein external surfaces of said side walls are provided with a light-absorbing material.

23. The illumination device as recited in claim 19, and further comprising one or more light collection surfaces provided on internal surfaces of said housing, said light collection surfaces collecting and reflecting light into said light color conversion system.

24. The illumination device as recited in claim 12, wherein the light color conversion system is substantially composed of polyurethane.

25. The illumination device as recited in claim 12, wherein the light color conversion system is comprised of a plurality of light-transmitting fluorescent layers.

26. An illumination device, comprising:
   a light source;

an intermediate light-transmitting medium extending along and positioned adjacent said light source, said intermediate light-transmitting medium being tinted with a predetermined combination of one or more fluorescent dyes; and a substantially rod-like member having a predetermined length with a light-receiving surface and a light-emitting surface, said member being composed of a material that has both optical waveguide and light scattering properties, and the light-receiving surface of said rod-like member being positioned adjacent said intermediate light-transmitting medium;

wherein light emitted from said light source and having a first perceived color is partially absorbed by the predetermined combination of fluorescent dyes of said intermediate light-transmitting medium, such that light transmitted through said intermediate light-transmitting medium to the light-receiving surface of said rod-like member has a second perceived color resulting from a collective light of multiple wavelengths; and wherein the optical and light scattering properties of said rod-like member result in an elongated light intensity pattern on the light-emitting surface of said rod-like member along said predetermined length.

27. The illumination device as recited in claim 26, wherein said light source is a plurality of light-emitting diodes.

28. The illumination device as recited in claim 26, wherein the first perceived color is blue.

29. The illumination device as recited in claim 28, wherein the second perceived color is white.

30. The illumination device as recited in claim 28, wherein the second perceived color has color coordinates within the white region defined by the CIE Chromaticity diagram.

31. The illumination device as recited in claim 26, wherein the second perceived color is white.

32. The illumination device as recited in claim 26, wherein the second perceived color has color coordinates within the white region defined by the CIE Chromaticity diagram.

33. The illumination device as recited in claim 26, and further comprising a housing extending substantially the predetermined length of said rod-like member, said housing including a pair of side walls that define an open-ended channel, said light source being received and housed in said open-ended channel.

34. The illumination device as recited in claim 33, and further comprising one or more light collection surfaces provided on internal surfaces of said housing, said light collection surfaces collecting and reflecting light into said intermediate light-transmitting medium.

35. The illumination device as recited in claim 33, wherein external surfaces of said housing are provided with a light-absorbing material.

36. The illumination device as recited in claim 26, wherein the intermediate light-transmitting medium is comprised of a plurality of light-transmitting fluorescent layers.

37. The illumination device as recited in claim 36, wherein each light-transmitting fluorescent layer is tinted with a separate and predetermined combination of one or more of the fluorescent dyes.

38. An illumination device, comprising:
a light source;
an intermediate light-transmitting medium extending along and positioned adjacent said light source, said intermediate light-transmitting medium being tinted with a predetermined combination of one or more fluorescent dyes; and a substantially rod-like member having a predetermined length with a light-receiving surface and a light-emitting surface, said member being composed of a material that has both optical waveguide and light scattering properties, and the light-receiving surface of said member being positioned adjacent said intermediate light-transmitting medium;

wherein light of a predetermined wavelength is emitted from said light source and is partially absorbed by the predetermined combination of dyes of said intermediate light-transmitting medium and causes each of said dyes to emit light of a particular wavelength, such that light transmitted through said intermediate light-transmitting medium to the light-receiving surface of said rod-like member is a collective light of multiple wavelengths; and wherein the optical and light scattering properties of said rod-like member result in an elongated light intensity pattern on the light-emitting surface of said rod-like member along said predetermined length.

39. The illumination device as recited in claim 38, wherein said light source is a plurality of light-emitting diodes.

40. The illumination device as recited in claim 38, wherein the collective light of multiple wavelengths is perceived as white light by an observer.

41. The illumination device as recited in claim 38, and further comprising a housing extending substantially the predetermined length of said rod-like member, said housing including a pair of side walls that define an open-ended channel, said light source being received and housed in said open-ended channel.

42. The illumination device as recited in claim 41, and further comprising one or more light collection surfaces provided on internal surfaces of said housing, said light collection surfaces collecting and reflecting light into said intermediate light-transmitting medium.

43. The illumination device as recited in claim 42, wherein external surfaces of said housing are provided with a light-absorbing material.

44. A method of constructing an illumination device for simulating neon lighting, comprising the steps of:
providing a light source;
positioning a light-transmitting medium adjacent said light source, said light-transmitting medium being tinted with one or more fluorescent dyes, such that when light of a predetermined wavelength is emitted from said light source and is partially absorbed by the dyes of said light-transmitting medium, each of said dyes emit light of a particular wavelength, such that light emitted from said light-transmitting medium is a collective light of multiple wavelengths;
positioning a substantially rod-like member having a predetermined length with a light-receiving surface and a light-emitting surface adjacent said light-transmitting medium, such that when the collective light of multiple wavelengths is transmitted through said light-transmitting medium to the light-receiving surface of said rod-like member, an elongated and substantially uniform light intensity pattern is perceived on the light-emitting surface of said rod-like member along said predetermined length.

45. The method as recited in claim 44, wherein said substantially rod-like member is composed of a material that has both optical waveguide and light scattering properties.

46. An illumination device, comprising:
   a plurality of light-emitting diodes emitting light of a predetermined first color; and
   a light color conversion system, including
      a substantially rod-like member having a predetermined length with a light-receiving surface and a light-emitting surface, the light-receiving surface of said rod-like member being positioned adjacent said light-emitting diodes,
      one or more fluorescent dyes contained in said substantially rod-like member, each of said dyes emitting light of one or more predetermined wavelengths following absorption of light from said light-emitting diodes and from other of said fluorescent dyes, wherein light observed along the light-emitting surface of said rod-like member is perceived as having a color different than the predetermined first color of light emitted by said light-emitting diodes.

47. The illumination device as recited in claim 46, wherein said substantially rod-like member is composed of a material that has both optical waveguide and light scattering properties, resulting in an elongated and substantially uniform light intensity pattern on the light-emitting surface of said rod-like member along said predetermined length.

* * * * *